United States Patent
Kim et al.

(10) Patent No.: US 10,372,573 B1
(45) Date of Patent: Aug. 6, 2019

(54) METHOD AND DEVICE FOR GENERATING TEST PATTERNS AND SELECTING OPTIMIZED TEST PATTERNS AMONG THE TEST PATTERNS IN ORDER TO VERIFY INTEGRITY OF CONVOLUTION OPERATIONS TO ENHANCE FAULT TOLERANCE AND FLUCTUATION ROBUSTNESS IN EXTREME SITUATIONS

(71) Applicant: Stradvision, Inc., Gyeongbuk (KR)

(72) Inventors: Kye-Hyeon Kim, Seoul (KR);
Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: Stradvision, INC., Gyeongbuk (KR)

( * ) Notice: Subject to any disclaimer, the term of this patent is extended or adjusted under 35 U.S.C. 154(b) by 0 days.

(21) Appl. No.: 16/258,841

(22) Filed: Jan. 28, 2019

(51) Int. Cl.
*G06F 11/263* (2006.01)
*G06F 11/00* (2006.01)
*G06F 11/26* (2006.01)

(52) U.S. Cl.
CPC ............ *G06F 11/263* (2013.01); *G06F 11/00* (2013.01); *G06F 11/26* (2013.01)

(58) Field of Classification Search
CPC ......... G06F 11/263; G06F 11/00; G06F 11/26
See application file for complete search history.

(56) References Cited

U.S. PATENT DOCUMENTS

| | | | | |
|---|---|---|---|---|
| 3,600,681 A | * | 8/1971 | Arbuckle | .......... H04L 25/03038 333/18 |
| 7,248,982 B1 | * | 7/2007 | Draving | ........... G01R 31/31709 375/226 |
| 10,146,914 B1 | * | 12/2018 | Victors | .............. G01N 21/6458 |

(Continued)

*Primary Examiner* — Joseph D Torres
(74) *Attorney, Agent, or Firm* — FisherBroyles, LLP; Susan M. Oiler

(57) ABSTRACT

A method for generating one or more test patterns and selecting optimized test patterns among the test patterns to verify an integrity of convolution operations is provided for fault tolerance, fluctuation robustness in extreme situations, functional safety of the convolution operations, and annotation cost reduction. The method includes: a computing device (a) instructing a pattern generating unit to generate the test patterns by using a certain function such that saturation does not occur while at least one original CNN applies the convolution operations to the test patterns; (b) instructing a pattern evaluation unit to generate each of evaluation scores of each of the test patterns by referring to each of the test patterns and one or more parameters of the original CNN; and (c) instructing a pattern selection unit to select the optimized test patterns among the test patterns by referring to the evaluation scores.

26 Claims, 5 Drawing Sheets

(56) References Cited

U.S. PATENT DOCUMENTS

| | | | |
|---|---|---|---|
| 2004/0073858 A1* | 4/2004 | Cheung | G06F 11/221 |
| | | | 714/732 |
| 2006/0074653 A1* | 4/2006 | Mitari | G06K 9/00248 |
| | | | 704/240 |
| 2017/0032285 A1* | 2/2017 | Sharma | G06N 3/08 |
| 2017/0364800 A1* | 12/2017 | Kiranyaz | G05B 23/00 |
| 2018/0173495 A1* | 6/2018 | Podder | G06F 11/00 |
| 2018/0174062 A1* | 6/2018 | Simo | G06N 3/04 |
| 2018/0285731 A1* | 10/2018 | Heifets | G06N 3/08 |

* cited by examiner

METHOD AND DEVICE FOR GENERATING TEST PATTERNS AND SELECTING OPTIMIZED TEST PATTERNS AMONG THE TEST PATTERNS IN ORDER TO VERIFY INTEGRITY OF CONVOLUTION OPERATIONS TO ENHANCE FAULT TOLERANCE AND FLUCTUATION ROBUSTNESS IN EXTREME SITUATIONS

FIELD OF THE DISCLOSURE

The present disclosure relates to a method and a computing device for use with an autonomous vehicle; and more particularly, to the method and the computing device for generating test patterns and selecting optimized test patterns to verify an integrity of convolution operations.

BACKGROUND OF THE DISCLOSURE

Deep Convolution Neural Networks (Deep CNNs) are at the heart of the remarkable development in deep learning. CNNs have already been used in the 90's to solve the problems of character recognition, but their use has become as widespread as it is now thanks to recent research. These CNNs won the 2012 ImageNet image classification tournament, crushing other competitors. Then, the convolution neural network became a very useful tool in the field of the machine learning.

The CNNs are sometimes used in a field of autonomous driving of a vehicle. That is, the vehicle can be safely driven via a function of detecting obstacles, free spaces, and the like by analyzing images obtained with a camera attached to the vehicle.

It is security of the CNNs for the autonomous driving that should be considered to be very important when the CNNs are actually used for the autonomous driving. As the autonomous vehicle with heavy weight moves at high speeds, the risk is high in case of an erroneous driving. Specifically, if a hacker with a bad intention falsifies parameters of the CNNs for the autonomous driving by hacking the CNNs, the autonomous vehicle may be used for terrorism.

Therefore, it is necessary to verify whether the parameters of the CNN during a test process are same as those of the CNN at the time when the CNN has completed its learning process. Researches so far have been focused mainly on how many effects the CNNs can have on driving the vehicle, and there is little research on how to maintain the security.

SUMMARY OF THE DISCLOSURE

It is an object of the present disclosure to solve all the aforementioned problems.

It is another object of the present disclosure to secure driving of an autonomous vehicle against hackers through a method for generating one or more test patterns to verify an integrity of one or more parameters of a convolutional neural network (CNN) by using at least one test pattern.

It is still another object of the present disclosure to improve the method for selecting one or more optimized test patterns in order to verify the integrity of the parameters of the CNN through evaluation of the test patterns.

In accordance with one aspect of the present disclosure, there is provided a method for generating one or more test patterns and selecting one or more optimized test patterns among the test patterns in order to verify an integrity of one or more convolution operations, including steps of: (a) a computing device instructing at least one pattern generating unit to generate the test patterns by using a certain function such that saturation does not occur while at least one original Convolution Neural Network (CNN) applies the convolution operations to the test patterns inputted thereto; (b) the computing device instructing at least one pattern evaluation unit to generate each of evaluation scores of each of the test patterns by referring to said each of the test patterns and one or more parameters of the original CNN; and (c) the computing device instructing at least one pattern selection unit to select the optimized test patterns among the test patterns by referring to the evaluation scores.

As one example, the method further includes a step of: (d) the computing device instructing at least one integrity verification module to generate at least one extended input by integrating at least one original input and at least one specific optimized test pattern, among the optimized test patterns, and, if the original CNN generates at least one verification output by using the extended input, the computing device instructing the integrity verification module to verify an integrity of the original CNN by referring to the verification output.

As one example, at the step of (a), the computing device instructs the pattern generating unit (i) to generate one or more preliminary test patterns by using the certain function, (ii) to input the preliminary test patterns to the original CNN and classify each of the preliminary test patterns into a first type and a second type, wherein the first type represents a first part of the preliminary test patterns which has undergone the saturation when the original CNN applies the convolution operations thereto, and wherein the second type represents a second part of the preliminary test patterns which has not undergone the saturation when the original CNN applies the convolution operations thereto, and (iii) to generate the test patterns including the preliminary test patterns of the second part and one or more adjusted preliminary test patterns, wherein the adjusted preliminary test patterns are generated by adjusting at least part of values included in the preliminary test patterns of the first part so that the saturation does not occur while the original CNN applies the convolution operations to the adjusted preliminary test patterns.

As one example, while the original CNN applies the convolution operations to a specific preliminary test pattern among the preliminary test patterns, the computing device instructs the pattern generating unit to determine whether the specific preliminary test pattern belongs to the first type or the second type by referring to information on whether the saturation occurs or not at least one of (i) whenever at least one result value of one or more weight operations on specific values included in the specific preliminary test pattern is added to one or more previous result values of the weight operations on one or more values before the specific values and (ii) whenever one or more bias operations are applied to a total sum of all result values.

As one example, the step of (b) includes steps of: (b1) the computing device instructing the pattern evaluation unit to generate one or more specific changed test patterns, which are one or more results of changing each bit included in a specific test pattern among the test patterns; and (b2) the computing device, if the convolution operations are applied to the specific changed test patterns and the specific test pattern by the original CNN, instructing the pattern evaluation unit to generate at least one specific evaluation score of the specific test pattern by calculating a frequency of each of the results of the convolution operations on the specific changed test patterns being same as at least one result of the convolution operations on the specific test pattern.

As one example, at the step of (b), the computing device instructs the pattern evaluation unit (i) to calculate difference values between a result of one or more weight operations, applied by the original CNN, on a specific test pattern among the test patterns and a result of the weight operations on a changed specific test pattern generated by changing each of bits of the specific test pattern, (ii) to determine whether each of the difference values is included in its corresponding specific range where a result of the convolution operations on the changed specific test pattern is not different from a result of the convolution operations on the specific test pattern, and (iii) to generate a specific evaluation score of the specific test pattern by calculating a frequency of each of the difference values being included in its corresponding specific range.

As one example, at the step of (b), if a specific bit among the bits of the specific test pattern is changed, the computing device instructs the pattern evaluation unit to determine at least one specific detailed evaluation score, corresponding to the specific bit, included in the specific evaluation score by referring to a ratio of a subset to specific difference values, wherein the specific difference values correspond to the specific bit, outputted from each of output channels, and wherein the subset is selected among the specific difference values in case the subset is included in its corresponding specific range.

As one example, the step of (b) includes steps of: (b1) the computing device instructing the pattern evaluation unit to generate one or more changed CNNs, which are one or more results of changing each bit included in the parameters of the original CNN; and (b2) the computing device, if the changed CNNs apply one or more changed convolution operations to a specific test pattern among the test patterns, and if the original CNN applies the convolution operations to the specific test pattern, instructing the pattern evaluation unit to generate a specific evaluation score of the specific test pattern by calculating a frequency of each result of the changed convolution operations, applied by each of the changed CNNs, on the specific test pattern being same as a result of the convolution operations on the specific test pattern.

As one example, at the step of (b), the computing device instructs the pattern evaluation unit (i) to calculate difference values, each of which corresponds to each bit included in the parameters of the original CNN, between a result of one or more weight operations applied to a specific test pattern, among the test patterns, by the original CNN and one or more results of one or more changed weight operations applied to the specific test pattern by one or more changed CNNs generated by changing each bit included in the parameters of the original CNN, (ii) to determine whether each of the difference values is included in its corresponding specific range where the results of the changed weight operations do not affect a result of the convolution operations on the specific test pattern, and (iii) to generate a specific evaluation score of the specific test pattern by calculating a frequency of each of the difference values being included in its corresponding specific range.

As one example, at the step of (b), if the changed CNN is generated by changing at least one specific bit included in a specific convolution parameter among the parameters of the original CNN, the computing device instructs the pattern evaluation unit to determine a specific detailed evaluation score, corresponding to the specific bit, included in the specific evaluation score by referring to a ratio of a subset of specific difference values between the result of the weight operations applied to the specific test pattern by the original CNN and the results of the changed weight operations on the specific test pattern by the changed CNNs, wherein the specific difference values correspond to the specific bit, and wherein the subset is selected among the specific difference values in case the subset is included in its corresponding specific range.

As one example, at the step of (a), the certain function is a function of at least one random number generator, and the computing device instructs the pattern generating unit to generate the test patterns by using one or more random numbers generated by the function of the random number generator.

As one example, at the step of (a), the saturation is a case where absolute values of at least part among one or more detailed result values of one or more detailed operation processes included in the convolution operations on the test patterns are larger than their corresponding threshold numbers, wherein each of the threshold numbers corresponding to each of the detailed result values is a maximum absolute value that can be represented in the number of bits assigned to said each of the detailed result values.

As one example, at the step of (b), the computing device instructs the pattern evaluation unit to generate a specific evaluation score of a specific test pattern among the test patterns by referring to a result of the convolution operations on at least one specific single bit which is changed, wherein the specific single bit is selected according to a uniform probability among bits included in the specific test pattern and bits included in the parameters of the original CNN.

In accordance with another aspect of the present disclosure, there is provided a computing device for generating one or more test patterns and selecting one or more optimized test patterns among the test patterns in order to verify an integrity of one or more convolution operations, including: at least one memory that stores instructions; and at least one processor configured to execute the instructions to perform processes of: (I) instructing at least one pattern generating unit to generate the test patterns by using a certain function such that saturation does not occur while at least one original Convolution Neural Network (CNN) applies the convolution operations to the test patterns inputted thereto, (II) instructing at least one pattern evaluation unit to generate each of evaluation scores of each of the test patterns by referring to said each of the test patterns and one or more parameters of the original CNN, and (III) instructing at least one pattern selection unit to select the optimized test patterns among the test patterns by referring to the evaluation scores.

As one example, the processor further performs a process of: (IV) instructing at least one integrity verification module to generate at least one extended input by integrating at least one original input and at least one specific optimized test pattern, among the optimized test patterns, and, if the original CNN generates at least one verification output by using the extended input, the computing device instructing the integrity verification module to verify an integrity of the original CNN by referring to the verification output.

As one example, at the process of (I), the processor instructs the pattern generating unit (i) to generate one or more preliminary test patterns by using the certain function, (ii) to input the preliminary test patterns to the original CNN and classify each of the preliminary test patterns into a first type and a second type, wherein the first type represents a first part of the preliminary test patterns which has undergone the saturation when the original CNN applies the convolution operations thereto, and wherein the second type represents a second part of the preliminary test patterns which has not undergone the saturation when the original CNN applies the convolution operations thereto, and (iii) to generate the test patterns including the preliminary test patterns of the second part and one or more adjusted preliminary test patterns, wherein the adjusted preliminary test patterns are generated by adjusting at least part of values included in the preliminary test patterns of the first part so that the saturation does not occur while the original CNN applies the convolution operations to the adjusted preliminary test patterns.

As one example, while the original CNN applies the convolution operations to a specific preliminary test pattern among the preliminary test patterns, the processor instructs the pattern generating unit to determine whether the specific preliminary test pattern belongs to the first type or the second type by referring to information on whether the saturation occurs or not at least one of (i) whenever at least one result value of one or more weight operations on specific values included in the specific preliminary test pattern is added to one or more previous result values of the weight operations on one or more values before the specific values and (ii) whenever one or more bias operations are applied to a total sum of all result values.

As one example, the process of (II) includes processes of: (II-1) instructing the pattern evaluation unit to generate one or more specific changed test patterns, which are one or more results of changing each bit included in a specific test pattern among the test patterns; and (II-2) if the convolution operations are applied to the specific changed test patterns and the specific test pattern by the original CNN, instructing the pattern evaluation unit to generate at least one specific evaluation score of the specific test pattern by calculating a frequency of each of the results of the convolution operations on the specific changed test patterns being same as at least one result of the convolution operations on the specific test pattern.

As one example, at the process of (II), the processor instructs the pattern evaluation unit (i) to calculate difference values between a result of one or more weight operations, applied by the original CNN, on a specific test pattern among the test patterns and a result of the weight operations on a changed specific test pattern generated by changing each of bits of the specific test pattern, (ii) to determine whether each of the difference values is included in its corresponding specific range where a result of the convolution operations on the changed specific test pattern is not different from a result of the convolution operations on the specific test pattern, and (iii) to generate a specific evaluation score of the specific test pattern by calculating a frequency of each of the difference values being included in its corresponding specific range.

As one example, at the process of (II), if a specific bit among the bits of the specific test pattern is changed, the processor instructs the pattern evaluation unit to determine at least one specific detailed evaluation score, corresponding to the specific bit, included in the specific evaluation score by referring to a ratio of a subset to specific difference values, wherein the specific difference values correspond to the specific bit, outputted from each of output channels, and wherein the subset is selected among the specific difference values in case the subset is included in its corresponding specific range.

As one example, the process of (II) includes processes of: (II-1) instructing the pattern evaluation unit to generate one or more changed CNNs, which are one or more results of changing each bit included in the parameters of the original CNN; and (II-2) if the changed CNNs apply one or more changed convolution operations to a specific test pattern among the test patterns, and if the original CNN applies the convolution operations to the specific test pattern, instructing the pattern evaluation unit to generate a specific evaluation score of the specific test pattern by calculating a frequency of each result of the changed convolution operations, applied by each of the changed CNNs, on the specific test pattern being same as a result of the convolution operations on the specific test pattern.

As one example, at the process of (II), the processor instructs the pattern evaluation unit (i) to calculate difference values, each of which corresponds to each bit included in the parameters of the original CNN, between a result of one or more weight operations applied to a specific test pattern, among the test patterns, by the original CNN and one or more results of one or more changed weight operations applied to the specific test pattern by one or more changed CNNs generated by changing each bit included in the parameters of the original CNN, (ii) to determine whether each of the difference values is included in its corresponding specific range where the results of the changed weight operations do not affect a result of the convolution operations on the specific test pattern, and (iii) to generate a specific evaluation score of the specific test pattern by calculating a frequency of each of the difference values being included in its corresponding specific range.

As one example, at the process of (II), if the changed CNN is generated by changing at least one specific bit included in a specific convolution parameter among the parameters of the original CNN, the processor instructs the pattern evaluation unit to determine a specific detailed evaluation score, corresponding to the specific bit, included in the specific evaluation score by referring to a ratio of a subset of specific difference values between the result of the weight operations applied to the specific test pattern by the original CNN and the results of the changed weight operations on the specific test pattern by the changed CNNs, wherein the specific difference values correspond to the specific bit, and wherein the subset is selected among the specific difference values in case the subset is included in its corresponding specific range.

As one example, at the process of (I), the certain function is a function of at least one random number generator, and the processor instructs the pattern generating unit to generate the test patterns by using one or more random numbers generated by the function of the random number generator.

As one example, at the process of (I), the saturation is a case where absolute values of at least part among one or more detailed result values of one or more detailed operation processes included in the convolution operations on the test patterns are larger than their corresponding threshold numbers, wherein each of the threshold numbers corresponding to each of the detailed result values is a maximum absolute value that can be represented in the number of bits assigned to said each of the detailed result values.

As one example, at the process of (II), the processor instructs the pattern evaluation unit to generate a specific evaluation score of a specific test pattern among the test patterns by referring to a result of the convolution operations on at least one specific single bit which is changed, wherein the specific single bit is selected according to a uniform probability among bits included in the specific test pattern and bits included in the parameters of the original CNN.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained base on the drawings by those skilled in the art of the present disclosure without inventive work.

DETAILED DESCRIPTION

Figure 1:
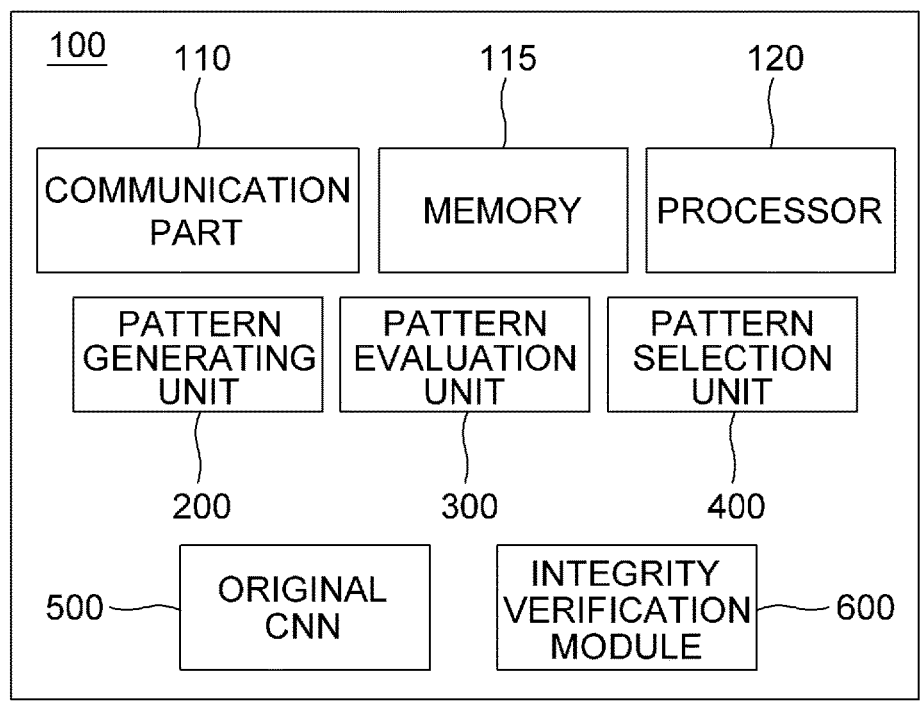
FIG. 1 is a drawing schematically illustrating a configuration of a computing device performing a method for generating one or more test patterns and selecting one or more optimized test patterns among the test patterns in order to verify an integrity of one or more convolution operations in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

FIG. 1 is a drawing schematically illustrating a configuration of a computing device performing a method for generating one or more test patterns and selecting one or more optimized test patterns among the test patterns in order to verify an integrity of one or more convolution operations in accordance with one example embodiment of the present disclosure.

By referring to FIG. 1, the computing device 100 may include at least one pattern generating unit 200, at least one pattern evaluation unit 300, at least one pattern selection unit 400, at least one original Convolution Neural Network (CNN) 500, and at least one integrity verification module 600. Inputting/outputting processes and operation processes of the pattern generating unit 200, the pattern evaluation unit 300, the pattern selection unit 400, the original CNN 500, and the integrity verification module 600 may be performed by at least one communication part 110 and at least one processor 120, respectively. In FIG. 1, however, a detailed connection between the communication part 110 and the processor 120 is omitted. Herein, at least one memory 115 may have previously stored instructions to be described later, and the processor 120 may be configured to execute the instructions stored in the memory 115, wherein the processor 120 may implement the present disclosure by performing processes below. Though the computing device 100 is described as above, the computing device 100 does not preclude at least one integrated processor, which is an integrated form of a medium, the processor, and the memory for practicing the disclosure.

The overall configuration of the computing device 100 has been described above. Hereinafter, the method for generating the test patterns and selecting the optimized test patterns among the test patterns in order to verify the integrity of the convolution operations in accordance with one embodiment of the present disclosure will be described as follow.

First of all, the computing device 100 may instruct the pattern generating unit 200 to generate the test patterns by using a certain function. As one example, the certain function may generate one or more numbers as a random number generator, which generates random numbers by using one or more seed values by time, or as a function having its own logics. If the numbers are generated by the certain function, the pattern generating unit 200 may generate the test patterns by using the generated numbers. However, saturation should not occur while the original CNN applies the convolution operations to the test patterns inputted thereto.

Herein, when at least part among one or more detailed result values are generated from one or more detailed operation processes included in the convolution operations on the test patterns, the saturation may be a case where each absolute value of said part among the detailed result values are larger than its corresponding threshold number. The threshold numbers may respectively correspond to the detailed result values. Specifically, each of the threshold number may be a maximum absolute value that can be represented in the number of bits of each memory assigned for storing each of the detailed result values by the computing device 100. In this case, each of the detailed result values may be represented to be smaller than its true value because of a lack of bits, and may affect a final result of the convolution operations on the test patterns. This is why the saturation should be prevented from occurring while the original CNN 500 applies the convolution operations to the test patterns.

Conditions for the test patterns are explained above, and hereinafter a method for generating the test patterns to satisfy the conditions will be explained.

That is, the computing device 100 may instruct the pattern generating unit 200 to generate one or more preliminary test patterns by using the numbers generated by the certain function. Next, each of the preliminary test patterns may be inputted to the original CNN 500, and may be classified into a first type and a second type by analyzing a process of the convolution operations thereon, wherein the first type represents a first part of the preliminary test patterns which has undergone the saturation during the process of the convolution operations thereon and the second type represents a second part of the preliminary test patterns which has not undergone the saturation during the process of the convolution operations thereon. Thereafter, at least part of values included the preliminary test patterns of the first part may be adjusted, thereby generating one or more adjusted preliminary test patterns, so that the saturation does not occur while the original CNN applies the convolution operations to the adjusted preliminary test patterns. Accordingly, the test patterns may be generated to include the preliminary test patterns of the second part and the adjusted preliminary test patterns.

Whether the saturation has occurred may not need to be determined after every detailed operation process but may be determined at the time when the saturation occurs frequently during the process of the convolution operations. For example, assuming that the convolution operations include one or more weight operations where weights are multiplied to an input and one or more bias operations where bias is added to the product of the input and the weights, while the original CNN applies the convolution operations to a specific preliminary test pattern among the preliminary test patterns, the original CNN 500 may determine whether the saturation has occurred or not (i) whenever at least one result value of the weight operations on specific values included in the specific preliminary test pattern is added to one or more previous result values of the weight operations on one or more values before the specific values and (ii) whenever the bias operations are applied to a total sum of all result values of the weight operations. Herein, the total sum may be a sum of all results of the weight operations on each of values included in the specific preliminary test pattern.

To explain this more specifically, pseudocode of general convolution operations will be explained as an example.

```
Iterate over i in [0, output channel -1]{
    Out(i) = 0
    Iterate over j in 4*[0, floor((input channel - 1)/4)]{
        Interm = 0
        Iterate over j in [j0, min(j0 + 3, input channel -1)]{
            Iterate over k in [0, conv kernel size - 1]
            Interm += in(j, k) * weight(i, j, k)}
        Out(i) = Out(i) + (Interm >> shift(i))}
    Out(i) = Out(i) + bias(i)}
```

During such convolution operations in the pseudo-code, the saturation may occur with a high frequency when operations of Out(i)=Out(i)+(Interm>>shift(i)) and Out(i)=Out(i)+bias(i) at a bottom are performed. Said times of (i) whenever the result value of the weight operations on the specific values is added to the previous result values of the weight operations on the values before the specific values and (ii) whenever the bias operations are applied to the total sum of the all result values may refer to when these operations at the bottom in the pseudocode are performed.

In case of the preliminary test patterns of the first part, which have undergone the saturation at the aforementioned times, at least part of the values included in the preliminary test patterns of the first part may be adjusted according to when the saturation has occurred and in which direction the saturation has occurred. Specifically, if the saturation has occurred because a sum of the result value of the weight operations on the specific values and one or more previous result values of the weight operations on values before the specific values is positive and an absolute value thereof is larger than the threshold number, the specific values may be adjusted in order to have a smaller result of the weight operations thereon. On the contrary, if the saturation has occurred because the sum of the result value of the weight operations on the specific values and the previous result values of the weight operations on the values before the specific values is negative and its absolute value is larger than the threshold number, the specific values may be adjusted in order to have larger result of the weight operations thereon. If the saturation has occurred while the bias operations are applied to the total sum of the all result values of the weight operations, at least part of the values included the preliminary test patterns of the first part may be adjusted similarly to the above.

The pattern generating unit 200 may generate the preliminary test patterns of the second part and the adjusted preliminary test patterns as the test patterns, wherein the adjusted preliminary test patterns are generated by adjusting at least part of the values included in the preliminary test patterns of the first part so that the saturation does not occur while the original CNN applies the convolution operations to the adjusted preliminary test patterns.

If the test patterns are generated as stated above, the computing device 100 may instruct the pattern evaluation unit 300 to generate each of evaluation scores of each of the test patterns by referring to said each of the test patterns and one or more parameters of the original CNN 500.

That is, the computing device 100 may instruct the pattern evaluation unit 300 to generate at least one specific evaluation score of a specific test pattern among the test patterns by referring to a result of the convolution operations on at least one specific single bit which is changed, wherein the specific single bit is selected according to a uniform probability among bits included in the specific test pattern and bits included in the parameters of the original CNN. Hereinafter, a case of selecting the specific single bit among the bits included in the specific test pattern and a case of selecting the specific single bit among the bits included in the parameters of the original CNN will be explained separately.

First, explained is the case where the specific single bit is selected among the values included in the specific test pattern. The computing device 100 may instruct the test pattern unit 300 to generate one or more specific changed test patterns, which are one or more results of changing each bit included in the specific test pattern. Such specific changed test patterns may be generated as many as the number of the bits included in the specific test pattern. Next, if the convolution operations are applied to the specific changed test patterns and the specific test pattern by the original CNN, the computing device 100 may instruct the pattern evaluation unit 300 to generate the specific evaluation score of the specific test pattern by calculating a frequency of each of results of the convolution operations on the specific changed test patterns being same as the result of the convolution operations on the specific test pattern. Herein, a case where the changed specific test pattern has no different result to the specific test pattern in the convolution operations, which is not appropriate for detecting the specific single bit, may be quantified by calculating the frequency.

The case where the specific single bit is selected among the bits included in the parameters of the original CNN is changed is similar to this. The computing device 100 may instruct the pattern evaluation unit 300 to generate one or more changed CNNs, not illustrated, which are one or more results of changing each bit included in the parameters of the original CNN 500. The changed CNNs may be generated as many as the number of the bits included in the parameters of the original CNN 500. Next, if the changed CNNs apply one or more changed convolution operations to the specific test pattern among the test patterns, and if the original CNN applies the convolution operations to the specific test pattern, the computing device 100 may instruct the pattern evaluation unit 300 to generate the specific evaluation score of the specific test pattern by calculating a frequency of each result of the changed convolution operations, applied by the changed CNNs, on the specific test pattern being same as the result of the convolution operations on the specific test pattern.

Although the specific changed test patterns and the changed CNNs are explained separately, the evaluation scores may be generated by using at least part of the specific changed test patterns and the changed CNNs or by using both, and each of weights may be assigned to each of them. For instance, if both of the specific changed test patterns and the changed CNNs are used for generating the evaluation score, and if changing the bits included in the parameters of the original CNN is determined to be more dangerous, the specific evaluation score generated by referring to the result of the changed convolution operations applied to the specific test pattern by the changed CNNs may be set as higher.

The evaluation score may be generated as explained above, but there is a disadvantage such as a large number of operations, as the convolution operations to the specific changed test patterns by the original CNN 500, the convolution operations to the specific test pattern by the original CNN 500, and the changed convolution operations to the specific test pattern by the changed CNNs are compared with one another after each operation thereof is completed.

Accordingly, an optimized method for evaluating the test patterns that may complement the disadvantage will be explained below.

In the optimized method, changes of results by a change may be important. Difference values between before and after the change may be calculated as follows. First of all, the computing device 100 may instruct the pattern evaluation unit 300 to calculate each of first difference values between the result of the convolution operations on the specific test pattern and each of results of the convolution operations on the specific changed test patterns generated by changing each of the bits of the specific test pattern, wherein each of the first difference values corresponds to each of the changed bits of the specific test pattern. Also, each of second difference values may be calculated between at least one result of one or more intermediate operations applied to the specific test pattern by the original CNN 500 and each of one or more results of one or more changed intermediate operations applied to the specific test pattern by the changed CNNs generated by changing each bit included in the parameters of the original CNN 500.

Herein, the computing device may instruct the pattern evaluation unit 300 to determine if each of the first difference values and the second difference values is in its corresponding specific range where a result of its corresponding operations is not different from the result of the convolution operations on the specific test pattern, and the computing device may instruct the test pattern evaluation unit 300 to generate the specific evaluation score of the specific test pattern by calculating a frequency of each of the first and the second difference values being included in its corresponding specific range. It can be determined by each of the specific ranges whether each result of the convolution operations corresponding to the first and the second difference values will be different from the result of the convolution operations applied to the specific test pattern by the original CNN.

Figure 2A:
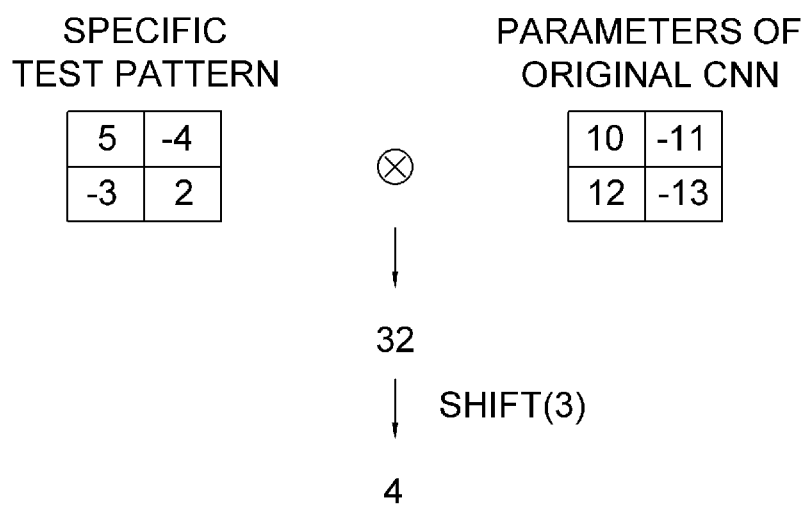
FIGS. 2A, 2B, and 2C are drawings for describing difference values and specific ranges to be used for the method for generating the test patterns and selecting the optimized test patterns among the test patterns in order to verify the integrity of the convolution operations in accordance with one example embodiment of the present disclosure.
Figure 2B:
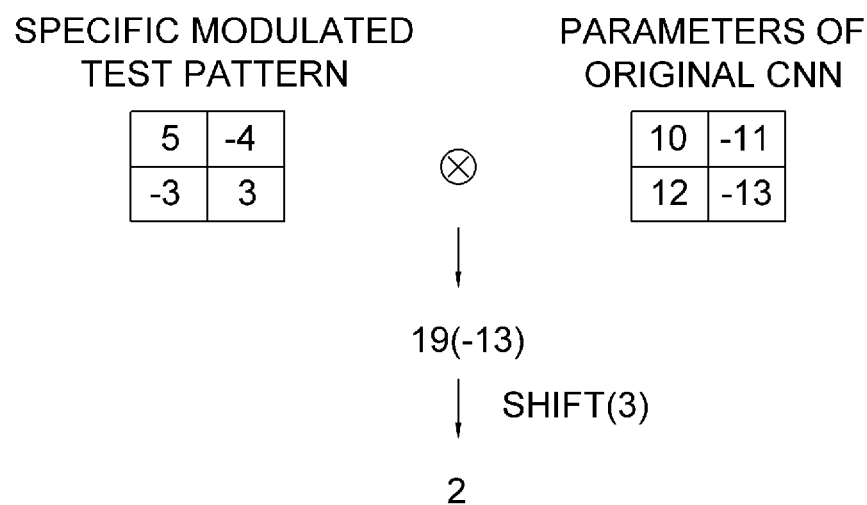
Figure 2C:
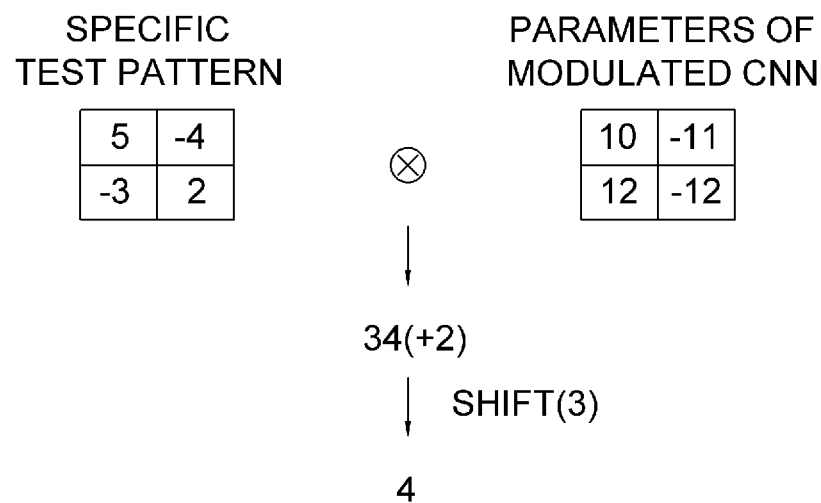

Each of the specific ranges, which corresponds to each of the first and the second difference values, may be determined according to a result of its corresponding operations. FIGS. 2A, 2B, and 2C are referred to in explaining the specific ranges, the first difference values, and the second difference values.

FIGS. 2A, 2B, and 2C are drawings for describing the first and the second difference values and the specific ranges to be used for the method for generating the test patterns and selecting the optimized test patterns among the test patterns in order to verify the integrity of the convolution operations in accordance with one example embodiment of the present disclosure.

First, as illustrated in FIG. 2A, original values included in the specific test pattern and their corresponding parameters of the original CNN are not changed. In this case, a result of the weight operations on the original values may be calculated as $5 \times 10 + -4 \times -11 + -3 \times 12 + 2 \times -13 = 32$. Then, the calculated result may be shifted. For instance, it may be shifted to the right by 3 bits. Herein, a detailed result of the weight operations on the original values may be 4.

FIG. 2B is a drawing schematically illustrating a case where one of the original values included in the specific test pattern is changed from 2 to 3. In this case, a first specific result of the weight operations may be calculated as 19, and a first specific difference value may be −13. If 19 is shifted to the right by 3 bits, a first specific detailed result may be calculated to be 2. As the first specific detailed result is different from the detailed result of the weight operations on the original values, the results of the convolution operations on the specific changed test patterns may be affected.

This may be expected without calculating the first specific result of the weight operations and the first detailed result. Firstly, the first specific difference value may be calculated by using a size of the changed bit and its corresponding weights, not by calculating difference value between the result of the weight operations on the original values and the first specific result of the weight operations and subtracting them. In FIG. 2B, where 2 has changed to 3, which is same as adding weights of −13 once more, it can be seen that the first specific difference value is −13 without calculating each of the results of the weight operations. Next, the result of the convolution operations of the changed specific test pattern may be expected by determining whether the first specific difference value is included in its corresponding specific range.

Herein, it can be said that each of the specific ranges, corresponding to each bit included in the original values, may be calculated by using the result of the weight operations on the original values.

In FIGS. 2A and 2B, if the result of the weight operations on the original values is interm, and if a value that can be ignored due to a bit shifting is g, an equation of g=interm&((1<<shift(0)−1) may be satisfied. This is because bits below an i-th bit are ignored by the bit shifting. If the first specific difference value is included in a range of [−g, (1<<shift(0)−1−g], change of a bit corresponding to the first specific difference value may not affect the result of the convolution operations of the changed specific test pattern. In this way, the specific ranges of the original values may be determined.

In FIG. 2B, as interm is 32 and i is 2, an equation of g=100000$_2$&(1000$_2$−1)=0 may be satisfied. Therefore, the first specific difference value may have to be in a range of 0 to 7 so that the change of its corresponding bit does not affect the result of the convolution operations applied to the specific changed test patterns by the original CNN 500. In the case of FIG. 2B, it can be expected and verified that the change of the bit, corresponding to the first specific difference value, may affect the result of the convolution operations applied to the specific changed test patterns by the original CNN 500, since the first specific difference value is not included in the range of 0 to 7.

In FIG. 2C, −13 of a bit included the parameters of the original CNN has been changed to −12. That is, the second specific difference value may be 2 because of an increase of 1, which is same as adding a value 2 of the specific test pattern once more. 2 can be included in the aforesaid specific range. Thus, it may be expected that the result of the changed convolution operations on the specific test pattern will be not different from the result of the convolution operations applied to the specific test pattern by the original CNN and may be verified as shown in FIG. 2C. Through such processes, it may be expected whether a change of each bit affect results of convolution operations.

For example, if a test pattern includes at least part of its bits whose difference values are in their corresponding specific ranges, and if the number of said part of the bits is larger than a threshold, the test pattern may have a relatively low evaluation score. If a result does not change in spite of a number of bit change, the test pattern is not suitable for detecting the bit change.

Herein, if a specific bit among the bits of the specific test pattern is changed, the computing device 100 may instruct the pattern evaluation unit 300 to determine at least one specific detailed evaluation score, corresponding to the specific bit, included in the specific evaluation score by referring to a ratio of a subset to the first specific difference values, wherein the first specific difference values correspond to the specific bit, outputted from each of output channels, and wherein the subset is selected among the first specific difference values in case each first specific difference values of the subset are included in its corresponding specific range. This is for distinguishing each of the first difference values when the subset is too large.

Similarly, if the changed CNN is generated by changing at least one specific bit included in a specific convolution parameter among the parameters of the original CNN, the computing device 100 may instruct the pattern evaluation unit 300 to determine the specific detailed evaluation score, corresponding to the specific bit, included in the specific evaluation score by referring to a ratio of a subset of specific difference values between the result of the weight operations applied to the specific test pattern by the original CNN and the results of the changed weight operations on the specific test pattern by the changed CNNs, wherein the specific difference values correspond to the specific bit, and wherein the subset is selected among the specific difference values in case the subset is included in its corresponding specific range. This may be also for distinguishing the subset among the second difference values.

When the evaluation scores are generated as stated above, the computing device 100 may instruct the pattern selection unit 400 to select the optimized test patterns among the test patterns by referring to the evaluation scores. That is, the optimized test patterns having high evaluation scores may be selected among the test patterns.

If the optimized test patterns are selected, the computing device 100 may instruct the integrity verification module 600 to generate at least one extended input by integrating at least one original input and at least one specific optimized test pattern, among the optimized test patterns, and, if the original CNN 500 generates at least one verification output by using the extended input, the computing device 100 may instruct the integrity verification module 600 to verify an integrity of the original CNN 500 by referring to the verification output. This is explained as below by referring to FIG. 3.

Figure 3:
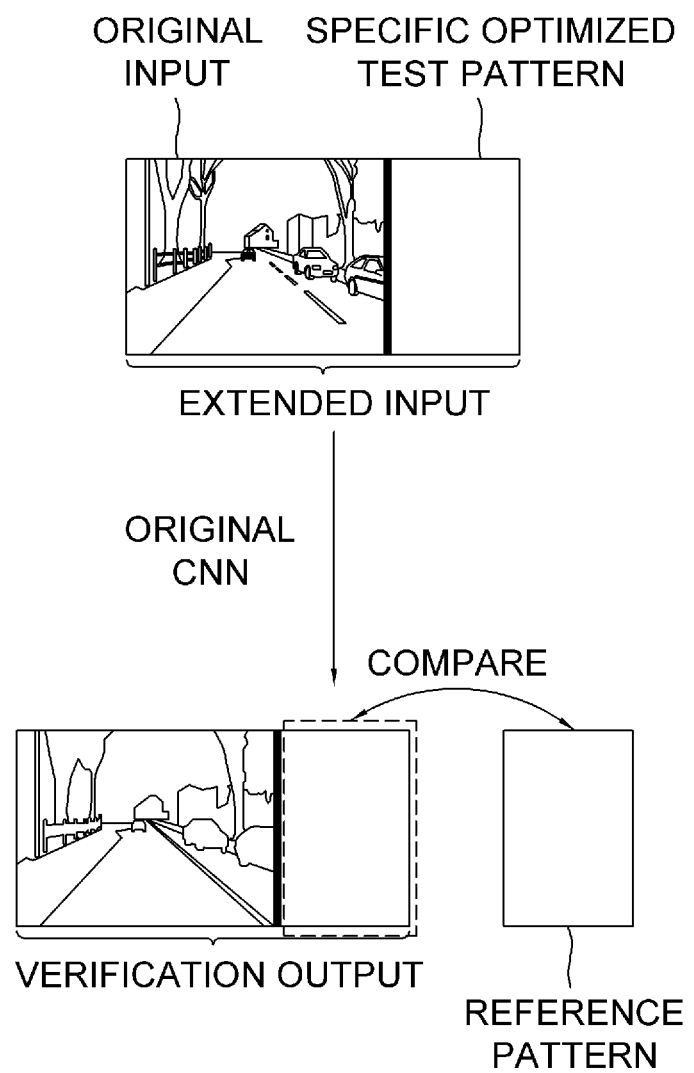
FIG. 3 is a drawing schematically illustrating a process of verifying the integrity of the convolution operations by using the optimized test patterns selected through the method for generating the test patterns and selecting the optimized test patterns among the test patterns in accordance with one example embodiment of the present disclosure.

FIG. 3 is a drawing schematically illustrating a process of verifying the integrity of the convolution operations by using the optimized test patterns selected through the method for generating the test patterns and selecting the optimized test patterns among the test patterns in accordance with one example embodiment of the present disclosure.

By referring to FIG. 3, the specific optimized test pattern may be added to the original input which the original CNN 500 acquires to perform its main function. At least one zero pattern may be located between the specific optimized test pattern and the original input as shown in FIG. 3 so that the specific optimized test pattern does not affect a result of the convolution operations on the original input. Such an extended input may be inputted to the original CNN 500 and may be converted to a verification output by the convolution operations thereon. Further, the integrity verification module 600 may verify an integrity of the original CNN 500 by referring to at least one part, corresponding to the specific optimized test pattern, of the verification output and the reference pattern. The reference pattern may be generated by inputting the specific optimized test pattern to the original CNN 500, on condition that an integrity of inputs and the parameters of the original CNN is guaranteed by a security level of the original CNN higher than a threshold level. Therefore, if the part, corresponding to the specific optimized test pattern, of the verification output does not correspond to the reference pattern, it may be determined that at least part of the parameters of the original CNN 500 have been changed or that the extended input has been changed in an inputting process of the extended input to the original CNN.

Although change of a single bit is mainly explained above, an optimized test pattern may be generated similarly when multiple bits are changed. Also, the process of the aforesaid convolution operations is similar to that of integer convolution operations, but not limited thereto.

In this way, the original CNN 500 may be secured against a hacker.

The present disclosure has an effect of securing driving of an autonomous vehicle against the hacker through the method for generating the test patterns to verify the integrity of the convolution operations by using the test pattern.

The present disclosure has an effect of improving the method for selecting the optimized test patterns to verify the integrity of the convolution operations through evaluation of the test patterns.

Further, the method in accordance with the present disclosure may be used to enhance fault tolerance, fluctuation robustness in extreme situations, and functional safety on the convolution operations, and may be used to reduce annotation costs.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for generating one or more test patterns and selecting one or more optimized test patterns among the test patterns in order to verify an integrity of one or more convolution operations, comprising steps of:
   (a) a computing device instructing at least one pattern generating unit to generate the test patterns by using a certain function such that saturation does not occur while at least one original Convolution Neural Network (CNN) applies the convolution operations to the test patterns inputted thereto;
   (b) the computing device instructing at least one pattern evaluation unit to generate each of evaluation scores of each of the test patterns by referring to said each of the test patterns and one or more parameters of the original CNN; and
   (c) the computing device instructing at least one pattern selection unit to select the optimized test patterns among the test patterns by referring to the evaluation scores.

2. The method of claim 1, wherein the method further comprises a step of:
   (d) the computing device instructing at least one integrity verification module to generate at least one extended input by integrating at least one original input and at least one specific optimized test pattern, among the optimized test patterns, and, if the original CNN generates at least one verification output by using the extended input, the computing device instructing the integrity verification module to verify an integrity of the original CNN by referring to the verification output.

3. The method of claim 1, wherein, at the step of (a), the computing device instructs the pattern generating unit (i) to generate one or more preliminary test patterns by using the certain function, (ii) to input the preliminary test patterns to the original CNN and classify each of the preliminary test patterns into a first type and a second type, wherein the first type represents a first part of the preliminary test patterns which has undergone the saturation when the original CNN applies the convolution operations thereto, and wherein the second type represents a second part of the preliminary test patterns which has not undergone the saturation when the original CNN applies the convolution operations thereto, and (iii) to generate the test patterns including the preliminary test patterns of the second part and one or more adjusted preliminary test patterns, wherein the adjusted preliminary test patterns are generated by adjusting at least part of values included in the preliminary test patterns of the first part so that the saturation does not occur while the original CNN applies the convolution operations to the adjusted preliminary test patterns.

4. The method of claim 3, wherein, while the original CNN applies the convolution operations to a specific preliminary test pattern among the preliminary test patterns, the computing device instructs the pattern generating unit to determine whether the specific preliminary test pattern belongs to the first type or the second type by referring to information on whether the saturation occurs or not at least one of (i) whenever at least one result value of one or more weight operations on specific values included in the specific preliminary test pattern is added to one or more previous result values of the weight operations on one or more values before the specific values and (ii) whenever one or more bias operations are applied to a total sum of all result values.

5. The method of claim 1, wherein the step of (b) includes steps of:
   (b1) the computing device instructing the pattern evaluation unit to generate one or more specific changed test patterns, which are one or more results of changing each bit included in a specific test pattern among the test patterns; and
   (b2) the computing device, if the convolution operations are applied to the specific changed test patterns and the specific test pattern by the original CNN, instructing the pattern evaluation unit to generate at least one specific evaluation score of the specific test pattern by calculating a frequency of each of the results of the convolution operations on the specific changed test patterns being same as at least one result of the convolution operations on the specific test pattern.

6. The method of claim 1, wherein, at the step of (b), the computing device instructs the pattern evaluation unit (i) to calculate difference values between a result of one or more weight operations, applied by the original CNN, on a specific test pattern among the test patterns and a result of the weight operations on a changed specific test pattern generated by changing each of bits of the specific test pattern, (ii) to determine whether each of the difference values is included in its corresponding specific range where a result of the convolution operations on the changed specific test pattern is not different from a result of the convolution operations on the specific test pattern, and (iii) to generate a specific evaluation score of the specific test pattern by calculating a frequency of each of the difference values being included in its corresponding specific range.

7. The method of claim 6, wherein, at the step of (b), if a specific bit among the bits of the specific test pattern is changed, the computing device instructs the pattern evaluation unit to determine at least one specific detailed evaluation score, corresponding to the specific bit, included in the specific evaluation score by referring to a ratio of a subset to specific difference values, wherein the specific difference values correspond to the specific bit, outputted from each of output channels, and wherein the subset is selected among the specific difference values in case the subset is included in its corresponding specific range.

8. The method of claim 1, wherein the step of (b) includes steps of:
(b1) the computing device instructing the pattern evaluation unit to generate one or more changed CNNs, which are one or more results of changing each bit included in the parameters of the original CNN; and
(b2) the computing device, if the changed CNNs apply one or more changed convolution operations to a specific test pattern among the test patterns, and if the original CNN applies the convolution operations to the specific test pattern, instructing the pattern evaluation unit to generate a specific evaluation score of the specific test pattern by calculating a frequency of each result of the changed convolution operations, applied by each of the changed CNNs, on the specific test pattern being same as a result of the convolution operations on the specific test pattern.

9. The method of claim 1, wherein, at the step of (b), the computing device instructs the pattern evaluation unit (i) to calculate difference values, each of which corresponds to each bit included in the parameters of the original CNN, between a result of one or more weight operations applied to a specific test pattern, among the test patterns, by the original CNN and one or more results of one or more changed weight operations applied to the specific test pattern by one or more changed CNNs generated by changing each bit included in the parameters of the original CNN, (ii) to determine whether each of the difference values is included in its corresponding specific range where the results of the changed weight operations do not affect a result of the convolution operations on the specific test pattern, and (iii) to generate a specific evaluation score of the specific test pattern by calculating a frequency of each of the difference values being included in its corresponding specific range.

10. The method of claim 9, wherein, at the step of (b), if the changed CNN is generated by changing at least one specific bit included in a specific convolution parameter among the parameters of the original CNN, the computing device instructs the pattern evaluation unit to determine a specific detailed evaluation score, corresponding to the specific bit, included in the specific evaluation score by referring to a ratio of a subset of specific difference values between the result of the weight operations applied to the specific test pattern by the original CNN and the results of the changed weight operations on the specific test pattern by the changed CNNs, wherein the specific difference values correspond to the specific bit, and wherein the subset is selected among the specific difference values in case the subset is included in its corresponding specific range.

11. The method of claim 1, wherein, at the step of (a), the certain function is a function of at least one random number generator, and the computing device instructs the pattern generating unit to generate the test patterns by using one or more random numbers generated by the function of the random number generator.

12. The method of claim 1, wherein, at the step of (a), the saturation is a case where absolute values of at least part among one or more detailed result values of one or more detailed operation processes included in the convolution operations on the test patterns are larger than their corresponding threshold numbers, wherein each of the threshold numbers corresponding to each of the detailed result values is a maximum absolute value that can be represented in the number of bits assigned to said each of the detailed result values.

13. The method of claim 1, wherein, at the step of (b), the computing device instructs the pattern evaluation unit to generate a specific evaluation score of a specific test pattern among the test patterns by referring to a result of the convolution operations on at least one specific single bit which is changed, wherein the specific single bit is selected according to a uniform probability among bits included in the specific test pattern and bits included in the parameters of the original CNN.

14. A computing device for generating one or more test patterns and selecting one or more optimized test patterns among the test patterns in order to verify an integrity of one or more convolution operations, comprising:
at least one memory that stores instructions; and
at least one processor configured to execute the instructions to perform processes of: (I) instructing at least one pattern generating unit to generate the test patterns by using a certain function such that saturation does not occur while at least one original Convolution Neural Network (CNN) applies the convolution operations to the test patterns inputted thereto, (II) instructing at least one pattern evaluation unit to generate each of evaluation scores of each of the test patterns by referring to said each of the test patterns and one or more parameters of the original CNN, and (III) instructing at least one pattern selection unit to select the optimized test patterns among the test patterns by referring to the evaluation scores.

15. The computing device of claim 14, wherein the processor further performs a process of: (IV) instructing at least one integrity verification module to generate at least one extended input by integrating at least one original input and at least one specific optimized test pattern, among the optimized test patterns, and, if the original CNN generates at least one verification output by using the extended input, the computing device instructing the integrity verification module to verify an integrity of the original CNN by referring to the verification output.

16. The computing device of claim 14, wherein, at the process of (I), the processor instructs the pattern generating unit (i) to generate one or more preliminary test patterns by using the certain function, (ii) to input the preliminary test patterns to the original CNN and classify each of the preliminary test patterns into a first type and a second type, wherein the first type represents a first part of the preliminary test patterns which has undergone the saturation when the original CNN applies the convolution operations thereto, and wherein the second type represents a second part of the preliminary test patterns which has not undergone the saturation when the original CNN applies the convolution operations thereto, and (iii) to generate the test patterns including the preliminary test patterns of the second part and one or more adjusted preliminary test patterns, wherein the adjusted preliminary test patterns are generated by adjusting at least part of values included in the preliminary test patterns of the first part so that the saturation does not occur while the original CNN applies the convolution operations to the adjusted preliminary test patterns.

17. The computing device of claim 16, wherein, while the original CNN applies the convolution operations to a specific preliminary test pattern among the preliminary test patterns, the processor instructs the pattern generating unit to determine whether the specific preliminary test pattern belongs to the first type or the second type by referring to information on whether the saturation occurs or not at least one of (i) whenever at least one result value of one or more weight operations on specific values included in the specific preliminary test pattern is added to one or more previous result values of the weight operations on one or more values before the specific values and (ii) whenever one or more bias operations are applied to a total sum of all result values.

18. The computing device of claim 14, wherein the process of (II) includes processes of:
 (II-1) instructing the pattern evaluation unit to generate one or more specific changed test patterns, which are one or more results of changing each bit included in a specific test pattern among the test patterns; and
 (II-2) if the convolution operations are applied to the specific changed test patterns and the specific test pattern by the original CNN, instructing the pattern evaluation unit to generate at least one specific evaluation score of the specific test pattern by calculating a frequency of each of the results of the convolution operations on the specific changed test patterns being same as at least one result of the convolution operations on the specific test pattern.

19. The computing device of claim 14, wherein, at the process of (II), the processor instructs the pattern evaluation unit (i) to calculate difference values between a result of one or more weight operations, applied by the original CNN, on a specific test pattern among the test patterns and a result of the weight operations on a changed specific test pattern generated by changing each of bits of the specific test pattern, (ii) to determine whether each of the difference values is included in its corresponding specific range where a result of the convolution operations on the changed specific test pattern is not different from a result of the convolution operations on the specific test pattern, and (iii) to generate a specific evaluation score of the specific test pattern by calculating a frequency of each of the difference values being included in its corresponding specific range.

20. The computing device of claim 19, wherein, at the process of (II), if a specific bit among the bits of the specific test pattern is changed, the processor instructs the pattern evaluation unit to determine at least one specific detailed evaluation score, corresponding to the specific bit, included in the specific evaluation score by referring to a ratio of a subset to specific difference values, wherein the specific difference values correspond to the specific bit, outputted from each of output channels, and wherein the subset is selected among the specific difference values in case the subset is included in its corresponding specific range.

21. The computing device of claim 14, wherein the process of (II) includes processes of:
 (II-1) instructing the pattern evaluation unit to generate one or more changed CNNs, which are one or more results of changing each bit included in the parameters of the original CNN; and
 (II-2) if the changed CNNs apply one or more changed convolution operations to a specific test pattern among the test patterns, and if the original CNN applies the convolution operations to the specific test pattern, instructing the pattern evaluation unit to generate a specific evaluation score of the specific test pattern by calculating a frequency of each result of the changed convolution operations, applied by each of the changed CNNs, on the specific test pattern being same as a result of the convolution operations on the specific test pattern.

22. The computing device of claim 14, wherein, at the process of (II), the processor instructs the pattern evaluation unit (i) to calculate difference values, each of which corresponds to each bit included in the parameters of the original CNN, between a result of one or more weight operations applied to a specific test pattern, among the test patterns, by the original CNN and one or more results of one or more changed weight operations applied to the specific test pattern by one or more changed CNNs generated by changing each bit included in the parameters of the original CNN, (ii) to determine whether each of the difference values is included in its corresponding specific range where the results of the changed weight operations do not affect a result of the convolution operations on the specific test pattern, and (iii) to generate a specific evaluation score of the specific test pattern by calculating a frequency of each of the difference values being included in its corresponding specific range.

23. The computing device of claim 22, wherein, at the process of (II), if the changed CNN is generated by changing at least one specific bit included in a specific convolution parameter among the parameters of the original CNN, the processor instructs the pattern evaluation unit to determine a specific detailed evaluation score, corresponding to the specific bit, included in the specific evaluation score by referring to a ratio of a subset of specific difference values between the result of the weight operations applied to the specific test pattern by the original CNN and the results of the changed weight operations on the specific test pattern by the changed CNNs, wherein the specific difference values correspond to the specific bit, and wherein the subset is selected among the specific difference values in case the subset is included in its corresponding specific range.

24. The computing device of claim 14, wherein, at the process of (I), the certain function is a function of at least one random number generator, and the processor instructs the pattern generating unit to generate the test patterns by using one or more random numbers generated by the function of the random number generator.

25. The computing device of claim 14, wherein, at the process of (I), the saturation is a case where absolute values of at least part among one or more detailed result values of one or more detailed operation processes included in the convolution operations on the test patterns are larger than their corresponding threshold numbers, wherein each of the threshold numbers corresponding to each of the detailed result values is a maximum absolute value that can be represented in the number of bits assigned to said each of the detailed result values.

26. The computing device of claim 14, wherein, at the process of (II), the processor instructs the pattern evaluation unit to generate a specific evaluation score of a specific test pattern among the test patterns by referring to a result of the convolution operations on at least one specific single bit which is changed, wherein the specific single bit is selected according to a uniform probability among bits included in the specific test pattern and bits included in the parameters of the original CNN.

* * * * *